(No Model.)
O. HUFF.
FILE.
No. 507,071. Patented Oct. 17, 1893.
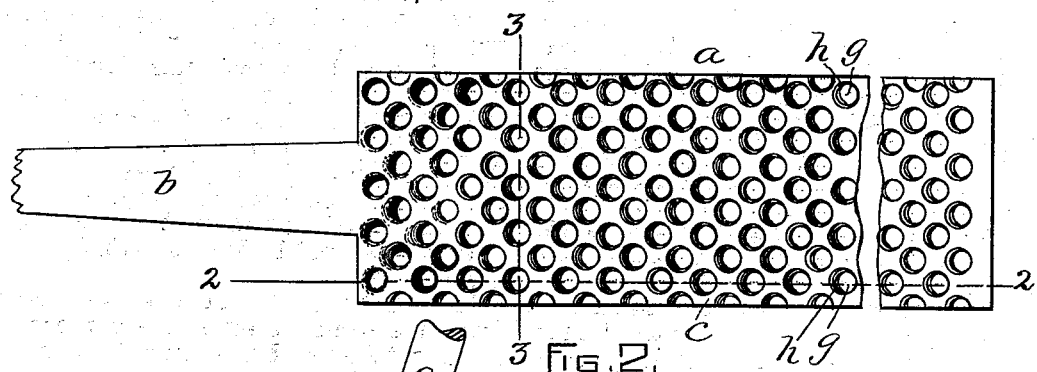
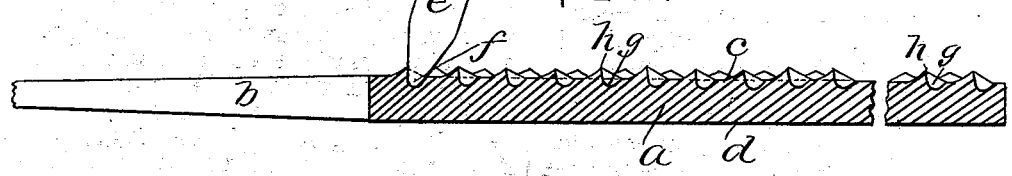
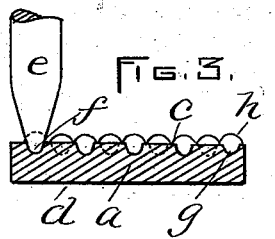
WITNESSES:
INVENTOR:
Orison Huff
by Wight, Brown & Crossley,
Attys.

UNITED STATES PATENT OFFICE.

ORISON HUFF, OF SOMERVILLE, ASSIGNOR OF ONE-HALF TO WILLIAM B. DRAPER, OF CAMBRIDGE, MASSACHUSETTS.

FILE.

SPECIFICATION forming part of Letters Patent No. 507,071, dated October 17, 1893.

Application filed May 27, 1893. Serial No. 475,809. (No model.)

*To all whom it may concern:*

Be it known that I, ORISON HUFF, of Somerville, in the county of Middlesex and State of Massachusetts, have invented certain new and useful Improvements in Files, of which the following is a specification.

This invention has relation to files and rasps; and it has for its object the provision of such improvements as will provide a most efficient cutting or filing surface, and at the same time avoid all liability of filling of the recesses in the face of the file by the chips or filings.

To these ends the invention consists of a file having circular concave indentations in its face, with curved filing or cutting fins or projections on the edges of the said indentations, all as is hereinafter more fully set forth and pointed out in the appended claim.

Reference is to be had to the annexed drawings and to the letters marked thereon forming a part of this specification, the same letters designating the same parts or features as the case may be, wherever they occur.

Of the drawings—Figure 1 is a face view of my improved file, part of the file being represented as broken away. Fig. 2 is a longitudinal sectional view taken on the line 2, 2 of Fig. 1 showing one position of the tooth forming tool in the formation of the file. Fig. 3 is a transverse section, taken on the line 3, 3 of Fig. 3, showing also the tooth forming tool in position.

In the drawings *a* designates the body and *b* is the handle of my improved file.

*c* is the face, and *d* is the back of body part.

In forming the teeth or cutting or filing features in the face of the file I may employ a tool *e* having a hardened rounded point *f*, which being placed upon the face of the file at an angle to the plane of the surface of said face and forced into the material to a slight depth, will form an indentation *g* therein having a concave bottom, without an angle of any kind, and raise up a curved fin or cutting tooth *h* around the said concave indentation. When the tool *e* is arranged in slanting position, or position at an angle to the face of the file the fin or cutting tooth *h* will be substantially of semi circular form, being raised quite high at the side in the direction in which the tool slants, and running down so as to almost if not quite disappear at the opposite side, as shown in the drawings. When the teeth are cut or raised in this way, I prefer to slant the tool toward the handle of the file, so that the most effective cutting or filing may be performed when the file is thrust forward. I may, however, form the teeth by arranging the tool *e* at a right angle to the plane of the face of the file, so that a circular tooth will be formed entirely around the concave indentation.

It is the concaved and entirely angleless form of the indentation adjacent to each filing or cutting tooth that constitutes the distinguishing feature of my improved file, which is designed primarily for operation upon soft or pliable material, such, for example, as lead, copper, brass and wood. The function accomplished by this form of indentation is the automatic freeing of itself from clogging, since if any material should for a moment become lodged in the indentation before the tooth, upon the further use of the tool other filed-off material bearing the least upon it will cause the momentarily lodged material to glance out and be freed from the indentation which would not be the case if the indentation were angular, or if holes were formed entirely through the file.

Having thus explained the nature of the invention and described a way of constructing and using the same, though without attempting to set forth all of the forms in which it may be made or all of the modes of its use, it is declared that what is claimed is—

A file having in its face circular angleless indentations with rounded bottoms, and filing or cutting fins or teeth on the edges of said indentations, all as herein shown and described.

In witness whereof I have signed my name to this specification, in the presence of two subscribing witnesses, this 6th day of May, A. D. 1893.

ORISON HUFF.

Witnesses:
ARTHUR W. CROSSLEY,
F. PARKER DAVIS.